United States Patent
Caimi et al.

(10) Patent No.: US 6,815,062 B2
(45) Date of Patent: Nov. 9, 2004

(54) CABLE, IN PARTICULAR FOR ELECTRIC ENERGY TRANSPORTATION OR DISTRIBUTION, AND AN INSULATING COMPOSITION USED THEREIN

(75) Inventors: Luigi Caimi, Lomagna (IT); Antonio Zaopo, Milan (IT); Enrico Albizzati, Lesa (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 192 days.

(21) Appl. No.: 10/022,206

(22) Filed: Dec. 20, 2001

(65) Prior Publication Data

US 2002/0150757 A1 Oct. 17, 2002

Related U.S. Application Data

(63) Continuation of application No. PCT/EP00/05446, filed on Jun. 14, 2000.
(60) Provisional application No. 60/140,448, filed on Jun. 23, 1999.

(30) Foreign Application Priority Data

Jun. 21, 1999 (EP) .............................. 99111860

(51) Int. Cl.$^7$ ........................... B32B 15/02; B32B 15/06
(52) U.S. Cl. .................. 428/390; 428/375; 428/379; 428/383
(58) Field of Search ................. 428/379, 380, 428/383, 390, 375; 524/571

(56) References Cited

U.S. PATENT DOCUMENTS

| | | | |
|---|---|---|---|
| 4,204,024 A | 5/1980 | Pye ........................... | 428/379 |
| 5,008,204 A | 4/1991 | Stehling ..................... | 436/85 |
| 5,229,478 A | 7/1993 | Floyd et al. ................. | 526/160 |
| 5,274,013 A | 12/1993 | Lieux ......................... | 523/455 |
| 5,414,040 A | 5/1995 | McKay et al. ............... | 524/576 |

FOREIGN PATENT DOCUMENTS

| | | |
|---|---|---|
| EP | 0 418 044 | 3/1991 |
| EP | 0 416 815 | 3/1997 |
| EP | 0 893 802 | 1/1999 |
| JP | 63-8408 | 1/1988 |
| JP | 64-54010 | 3/1989 |
| WO | WO 93/19107 | 9/1993 |
| WO | WO 96/37899 | 11/1996 |
| WO | WO 97/00288 | 1/1997 |
| WO | WO 97/00523 | 1/1997 |
| WO | WO 98/56012 | 12/1998 |

*Primary Examiner*—Monique R. Jackson
(74) *Attorney, Agent, or Firm*—Finnegan, Henderson, Farabow, Garrett & Dunner, L.L.P.

(57) ABSTRACT

The invention describes a cable, in particular for electric energy transportation or distribution, in which an electrically insulating layer is present, consisting of a material substantially free of lead or derivatives thereof, and having high resistance to water. This material includes an elastomer terpolymer having the following composition:

a) 50–90 moles percent of ethylene;

b) 10–50 moles percent of an α-olefin;

c) 0.16–5 moles percent of 5-vinyl-2-norbornene;

the sum of the moles percent of a), b), c) being 100, said terpolymer having a branching index of less than or equal to 0.5 and a molecular weight distribution index $M_w/M_n$ of greater than or equal to 6.

11 Claims, 2 Drawing Sheets

CABLE, IN PARTICULAR FOR ELECTRIC ENERGY TRANSPORTATION OR DISTRIBUTION, AND AN INSULATING COMPOSITION USED THEREIN

CROSS REFERENCE TO RELATED APPLICATIONS

This application is a continuation of International Application No. PCT/EP00/05446, filed Jun. 14, 2000, and claims the priority of EP99111860.5, filed Jun. 21, 1999, and the benefit of U.S. Provisional application No. 60/140,448, filed Jun. 23, 1999.

BACKGROUND OF THE INVENTION

1. Field of the Invention

This invention relates to a cable, in particular for electric energy transportation or distribution, and an insulating composition used therein.

In particular, the invention describes an electric cable and an insulating composition substantially free of lead or its derivatives, enabling cables to be produced having considerable mechanical and electrical properties and, in particular, an improved water resistance.

Cables have to be protected to limit damage deriving from moisture, abrasion, atmospheric chemicals etc., and have therefore to offer specific characteristics dictated and governed by international regulations.

2. Description of the Related Art

In particular, for electric energy transportation or distribution cables an extremely long operating life is required both to limit cost and to avoid their frequent replacement.

Cables for medium or high voltage electric energy transportation or distribution usually comprise a core formed from a conductor surrounded by one or more coverings of cross-linked polymer material, in particular polyethylene or ethylene copolymers suitably cross-linked after extrusion onto the conductor. These cross-linked materials maintain a high level of flexibility and satisfactory mechanical properties even under heating in continuous use and/or under current overload conditions.

To improve the performance of the insulating material, in particular its mechanical strength and hot-deformability, reinforcing fillers of various types, such as calcined kaolin talc and the like, are usually added to the base polymer material.

Generally, to prevent decay of dielectric strength with time, in particular in the presence of moisture, leading to formation of insulation defects commonly known as water trees, lead compounds are also added to the insulating composition, of which those currently most used are oxides, preferably $Pb_2O_3$ and $Pb_3O_4$, phthalates, phosphites and mono-and di-stearates.

The need of substantially lead-free materials to provide increasing environmental compatibility has been felt in this field for a long time.

For example U.S. Pat. No. 4,204,024 describes a composition based on an ethylene-propylene elastomer (EPR, i.e. ethylene-propylene rubber) or, preferably, a non-conjugated ethylene-propylene-diene terpolymer (EPDM, i.e. ethylene propylene diene monomer), with vinyl silane, zinc oxide, a cross-linking agent (peroxide) and a cross-linking inhibitor to prevent premature cross-linking of the composition, the facility being provided to replace $Pb_2O_3$ or $Pb_3O_4$ with 0.1–2 parts by weight of lead peroxide, calculated on the compound, to eliminate the reddish coloration typically resulting from the use of said oxides. The use of this composition as electrical insulation should enable a reduction in the dielectric loss factor of the resultant cross-linked covering to be obtained.

WO 96/37899 describes a composition based on ethylene elastomer copolymers (EPR or EPDM, preferably obtained with metallocene catalysis) as the insulating material for cables, in which the lead compounds do not exceed one part by weight, calculated as the element. The compositions also contain a mineral filler in a quantity of 40–120 phr, i.e. parts per hundred rubber (of which at least 50% is calcined clay), a filler surface treatment agent (for example a silane) and zinc oxide in a quantity of between 10 and 30 phr.

To prepare water-resistant cables, U.S. Pat. No. 5,274,013 describes substantially lead-free elastomer compositions comprising a chlorinated polyolefin, preferably chlorinated polyethylene with a chlorine content of 25–45% by weight, an epoxide, a filler, a plasticizer, a cross-linking agent and possibly an EPDM polymer.

Patent application WO97/00523 describes polymer compositions including EPDM polymers, in which the diene is vinyl norbornene, which enable a uniform surface of reduced roughness to be obtained, at a higher extrusion rate than conventional elastomer compositions based on EPDM polymers in which the diene is selected from the group consisting of 5-ethylidene-2-norbornene (ENB), 1,4-hexadiene (HEX), 1,6-octadiene, 5-methyl-1,4-hexadiene, 3,7-dimethyl-1,6-octadiene and the like. In particular the compositions described therein enable a good cross-linking rate and a high level of cross-linking to be obtained, with relatively low dielectric losses.

Patent application WO98/56012 describes polymer compositions for cable insulation in which the base polymer material is a mixture of an EPDM terpolymer, substantially equivalent to the EPDMs described in WO97/00523, with a minority component in the form of an ethylene/α-olefin copolymer prepared by metallocene catalysis, able to further improve the physical properties of the resultant mixture over that described in WO97/00523.

However, the elastomer compositions described in both WO97/00523 and in WO98/56012 contemplate the presence of lead compounds, in the usual quantities (5 phr) for that field.

The substantial absence of lead in U.S. Pat. No. 4,204,024 or in WO96/37899 is compensated by using an extremely high percentage, of about 10–40 and 10–30 parts by weight respectively, of zinc oxide noting, explicitly in WO96/37899, that a quantity of 5% by weight, as is currently used in that field, is insufficient to obtain satisfactory electrical stability in the presence of moisture.

The use of a large quantity of zinc oxide evidently cannot constitute a desirable solution for a cable with low environmental impact, because of the pollution potential of zinc and its derivatives which, even though less than that of lead, is still not negligible.

On the other hand, the use of chlorinated polymers, as suggested in U.S. Pat. No. 5,274,013, involves evident environmental problems both during cable production and when the cable, at the end of its life, has to be disposed of in some manner. In this respect it is known that chlorinated polymers develop HCl on heating, with outstanding corrosion problems for the cable production plant, and environmental pollution.

SUMMARY OF THE INVENTION

On the basis of the experience of Applicant and of the aforedescribed known art, there still exists the technical problem of producing an electric cable with a covering consisting of a polymer material possessing mechanical and electrical properties adequate for the usual utilization conditions, while maintaining high electrical strength even in the presence of moisture, without using potentially polluting products which can present a problem when the cable has to be disposed of at the end of its life. The present applicant has unexpectedly found that the aforesaid technical problem can be solved by using as the base material for the insulating covering an elastomer terpolymer of ethylene, an α-olefin and 5-vinyl-2-norbornene, without the addition of lead-containing products.

In particular the present applicant has found that the electrical properties of the insulating covering, with reference in particular to dielectric strength and dielectric losses, remain substantially unaltered with time even in the presence of moisture, if the base material used for the insulating covering is an elastomer terpolymer of the following composition:

a) 50–90 moles percent of ethylene;
b) 10–50 moles percent of an α-olefin;
c) 0.16–5 moles percent of 5-vinyl-2-norbornene; the sum of the moles percent of a), b), c) being 100, said terpolymer having a branching index of less than or equal to 0.5 and a molecular weight distribution index $M_w/M_n$ of greater than or equal to 6.

According to a first aspect, the invention therefore provides an electric cable (1) comprising at least one conductor (2) and at least one insulating layer (4), wherein said insulating layer comprises a substantially lead-free polymer composition comprising as base polymer material an elastomer terpolymer having the following composition:

a) 50–90 moles percent of ethylene;
b) 10–50 moles percent of an α-olefin;
c) 0.16–5 moles percent of 5-vinyl-2-norbornene; the sum of the moles percent of a), b), c) being 100, said terpolymer having a branching index of less than or equal to 0.5 and a molecular weight distribution index $M_w/M_n$ of greater than or equal to 6.

In this description the expression "substantially lead-free" is meant to indicate that lead-containing substances are not added to the compositions of the invention or to the cables which use them. This does not however exclude that in the constituent materials of the insulating layer traces of lead or its derivatives may be present in negligible quantities and in any event less than the limits required to prevent environmental pollution problems.

The term "α-olefin" means an olefin of formula $CH_2=CH-R$, where R is a linear or branched alkyl containing 2 to 10 carbon atoms. The α-olefin can be selected for example from propylene, 1-butene, 1-pentene, 1,4-methyl-1-pentene, 1-hexene, 1-octene, 1-decene, 1-dodecene and the like and the combinations thereof. Propylene is particularly preferred for implementing the invention.

According to a preferred aspect, the terpolymer has a Mooney viscosity [ML (1+4) at 125° C.] of between 10 and 80, preferably between 15 and 60.

According to another preferred aspect, the aforesaid terpolymer has a branching index of less than or equal to 0.4.

According to a further preferred aspect, the cable comprises a substantially lead-free polymer composition having a zinc oxide content of less than 10 phr, preferably between 3 and 8 phr.

According to another aspect, the invention provides a substantially lead-free polymer composition comprising as base polymer material an elastomer terpolymer having the following composition:

a) 50–90 moles percent of ethylene;
b) 10–50 moles percent of an α-olefin;
c) 0.16–5 moles percent of 5-vinyl-2-norbornene; the sum of the moles percent of a), b), c) being 100, said terpolymer having a branching index of less than or equal to 0.5 and a molecular weight distribution index $M_w/M_n$ of greater than or equal to 6.

According to a preferred aspect, the invention provides a polymer composition in which the terpolymer has a Mooney viscosity [ML (1+4) at 125° C.] of 10–80, preferably between 15 and 60.

The substantially lead-free polymer compositions of the invention preferably have a zinc oxide content of less than 10 phr, in particular between 3 and 8 phr.

According to a preferred aspect, the cable of the invention comprising at least one conductor and at least one insulating layer also comprises at least one layer (3, 5) with semiconductive properties which includes a polymer composition as aforedefined in which a conductive filler is dispersed.

The relative degree of branching is calculated using the so-called branching index. The method for determining this index is described for example in "Ethylene-Propylene Elastomers", by Gray Ver Strate, Encyclopaedia of Polymer Science and Engineering, 6, 2nd Edition (1986). This method comprises measuring the following characteristics of the terpolymer in solution: the weight-average molecular weight ($M_{W,\ LALLS}$), measured by low angle laser light scattering; the weight-average molecular weight ($M_{W,\ DRI}$) and the viscometer-average molecular weight ($M_{v,\ DRI}$), both determined by measuring the differential refractive index; and the intrinsic viscosity (IV) measured in decalin at 135° C.

The average branching index (BI) is defined as:

$$BI = \frac{M_{v,br} \times M_{W,DRI}}{M_{W,LALLS} \times M_{v,DRI}} \quad (1)$$

where $M_{v,br}=k(IV)^{1/a}$, a being the Mark-Houwink constant (a=0.759 for the terpolymer ethylene/α-olefin/diene in decalin at 135° C.).

The branching index is 1 for a linear polymer, whereas for a branched polymer this index is less than 1 and decreases as the degree of branching increases.

Further information on the branching index is given for example in the article "Advanced EPDM for W&C application" by P. S. Ravishankar and N. R. Dharmara, published in Rubber World, December 1998, page 23 onwards.

The molecular weight distribution index (MDI) defined as the ratio of the weight-average molecular weight ($M_w$) to the number-average molecular weight ($M_n$) can be determined according to conventional techniques by gel permeation chromatography (GPC).

The elastomer terpolymers used in the invention are generally prepared by copolymerizing the corresponding monomers as described in patent application WO97/00523, the description of which is incorporated herein as reference. Further details concerning the synthesis of said terpolymers are given for example in Japanese patent applications JP 860151758 and JP 870210169, the descriptions of which are incorporated herein as reference.

The elastomer terpolymers used in the invention are preferably prepared from the corresponding monomers in the presence of vanadium Ziegler-Natta catalysts or single-site catalysts, in particular metallocene catalysts. Metallocene catalysts are known to be coordination complexes between a transition metal usually of Group IV, in particular titanium, zirconium or hafnium, and two possibly substituted cyclopentadienyl ligands used in combination with a co-catalyst, for example an alumoxane, preferably methylalumoxane, or a boron compound (see for example J. M. S.-Rev. Macromol.Chem.Phys., C34(3), 439–514 (1994); J. Organometallic Chemistry, 479 (1994), 1–29, or the patents U.S. Pat. Nos. 5,414,040, 5,229,478, WO 93/19107. Single-site catalysts suitable for preparing EPDM terpolymers are also the so-called constrained geometry catalysis described for example in EP-B-0416815 and EP-B-0418044.

Examples of elastomer terpolymers suitable for implementing the invention are obtainable commercially, for example under the name Vistalon$^R$ of Exxon Chemical.

According to another aspect, the cable of the invention includes an elastomer mixture comprising the elastomer terpolymer EPDM as heretofore described, in mixture with one or more different polymers already known in the art as materials for insulating electric cables. These additional polymers can be present in a quantity generally not exceeding 30 phr, preferably between 1 and 15 phr, of the mixture. They are generally polyolefins (either homopolymers or copolymers of different olefins), selected for example from: polyethylene (PE), in particular low density PE (LDPE), linear low density PE (LLDPE), very low density PE (VLDPE or ULDPE); polypropylene (PP); thermoplastic propylene/ethylene copolymers; elastomer ethylene/propylene (EPR) or ethylene/ propylene/diene (EPDM) copolymers, and the like, or the mixtures thereof.

In particular, the elastomer EPDM terpolymers suitable for the invention can be used in mixture with an ethylene/α-olefin or ethylene/α-olefin/diene copolymer prepared by copolymerizing the corresponding monomers in the presence of a single-site catalyst, in particular a metallocene or constrained geometry catalyst. The quantity of this copolymer is generally between 5 and 20% by weight with respect to the total weight of the polymer components of the insulating composition. This copolymer has generally an $M_w/M_n$ ratio of less than or equal to 4, preferably between 1.5 and 3.5, a composition distribution index (CDI) of greater than or equal to 45%, and a density of between 0.86 and 0.92 g/cm$^3$. The CDI, defined as the weight percentage of those copolymer molecules having an α-olefin content within 50% of the average total molar content of α-olefin, provides a measure of the α-olefin distribution within the copolymer molecules, and is determinable by temperature rising elution fractionation, as described for example in U.S. Pat. No. 5,008,204 and by Wild et al. in J. Poly. Sci. Poly. Phys. Ed., Vol. 20, pp. 441 and onwards (1982). Further details of the characteristics of these copolymers and their preparation are given for example in U.S. Pat. No. 5414040, U.S. Pat. No. 5229478, WO93/19107, EP 0416815 and EP 0418044.

The layer of insulating covering of the cable of the invention is preferably cross-linked by adding to the polymer composition a radical initiator, such as an organic peroxide selected for example from dicumyl peroxide, tert-butyl dicumyl peroxide, 2,5-dimethyl-2,5-di(tert-butylperoxy)-hexane, α-α'-bis(tert-butylperoxy) diisopropyl-benzene and the like or the mixtures thereof. Examples of suitable cross-linking agents are Dicup$^R$ (dicumyl peroxide) and Vulkup$^R$ [α-α'-bis(tert-butylperoxy) diisopropyl-benzene], both of Hercules.

Ethylene/α-olefin copolymers prepared with single-site catalysis are commercially obtainable under the names Engage$^R$ of Du Pont-Dow Elastomers and Exact$^R$ of Exxon Chemical.

The constituent polymer composition of the insulating layer according to the invention generally comprises a reinforcing filler in a quantity of between 20 and 100 phr, preferably between 30 and 70 phr.

Reinforcing fillers usable in the invention comprise for example calcium carbonate, calcined kaolin, talc and the like, or the mixtures thereof.

To favour compatibility between the mineral filler and the polymer matrix, a coupling agent can be added to the mixture, selected from those known in the art, for example silane compounds. Examples of silane compounds suitable for the purpose are γ-methacryloxy-propyltrimethoxy silane, ethyltriethoxy silane, methyltris-(2-methoxyethoxy) silane, dimethyl ethoxy silane, vinyltris-(2-methoxyethoxy) silane, vinyltrimethoxy silane, vinyltriethoxy silane, octyltriethoxy silane, isobutyl-triethoxy silane, isobutyl-trimethoxy silane, and the mixtures thereof.

The coupling agent can be used as such, or grafted onto at least one of the polymer components of the mixture.

The quantity of coupling agent to be added to the mixture depends mainly on the type of coupling agent used and on the quantity of mineral filler added, and is generally between 0.05 and 10%, preferably between 0.1 and 5%, by weight on the total weight of the base polymer mixture.

Other conventional components can be added to the aforedefined base polymer material, for example antioxidants, processing aids, lubricants, pigments, water-tree retardants, voltage stabilizers and the like.

Conventional antioxidants suitable for the purpose are for example: polymerized trimethyl-dihydroquinoline (for example poly-2,2,4-trimethyl-1,2-dihydroquinoline); 4,4'-thiobis-(3-methyl-6-tert-butyl)-phenol; pentaerythryl-tetra-[3-(3,5-ditert-butyl-4-hydroxyphenyl)propionate]; 2,2'-thiodiethylene-bis-[3-(3,5-ditert-butyl-4-hydroxyphenyl)-propionate] and the like, or the mixtures thereof. processing aids usually added to the polymer base are for example calcium stearate, zinc stearate, stearic acid, paraffin wax, silicone rubbers and the like, or the mixtures thereof.

With particular reference to medium and high voltage cables, the aforedefined polymer compositions can be advantageously used to form an insulating layer. In this respect, as stated heretofore, these compositions enable high mechanical characteristics to be achieved both at room temperature and under heating, and also provide improved electrical properties, in particular such as to maintain dielectric strength substantially unaltered with time, even in the presence of moisture.

If a semiconductive layer is to be formed, a conductive filler, particularly carbon black, is preferably dispersed within the polymer material in a quantity such as to impart semiconductive properties to the material (i.e. such as to obtain a resistivity of less than 5 ohm.m at room temperature). This quantity is generally between 5 and 80% by weight, preferably between 10 and 50% by weight, on the total mixture weight.

The ability to use the same type of polymer material both for the insulating layer and for the semiconductive layers is particularly advantageous in producing cables for medium or high voltage, in that it ensures optimum adhesion between adjacent layers and hence an improved electrical behaviour particularly at the interface between the insulating layer and the inner semiconductive layer where the electrical field and hence the risk of partial discharges are higher. For the purposes of the invention, "low voltage" generally means a voltage less than 1 kV, "medium voltage" means a voltage between 1 and 35 kV, and "high voltage" means a voltage greater than 35 kV.

The insulating composition of the invention can be prepared by mixing together the polymer component, the filler and any other additives present by methods known in the art. Mixing can be for example by an internal mixer of tangential (Banbury) or copenetrating rotor type, or by continuous mixers of Ko-Kneader (Buss) type or of co-rotating or counter-rotating double-screw type.

The cable of the invention can be formed by techniques conventionally used in the field, for example by extruding the polymer composition, cross-linking and cooling.

BRIRF DESCRIPTION OF THE DRAWINGS

Further details will be apparent from the following description, given with reference to the accompanying drawings, on which:

DETAILED DESCRIPTION OF THE PREFERRED EMBODIMENTS

Figure 1:
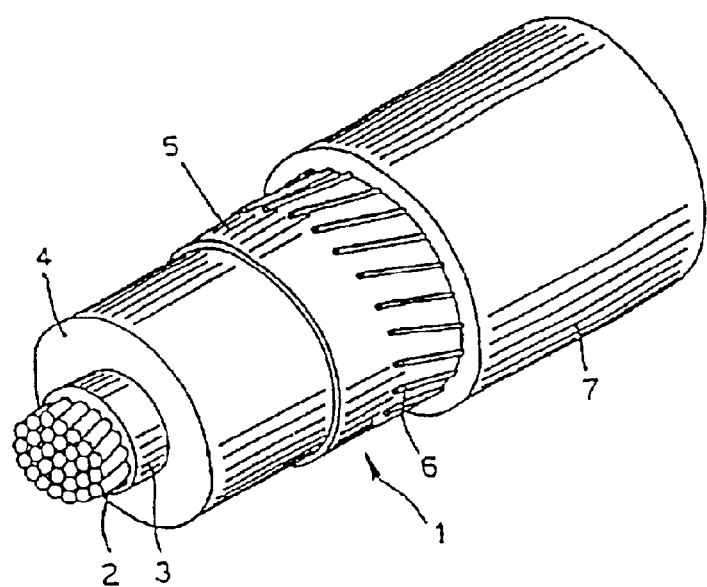
FIG. 1 is a perspective view of an electric cable particularly suitable for medium voltage, in accordance with the invention.

In FIG. 1, the cable 1 comprises a conductor 2, an inner layer with semiconductive properties 3, an intermediate layer with insulating properties 4, an outer layer with semiconductive properties 5, a metal screen 6, and an outer sheath 7.

The conductor 2 generally consists of metal wires, preferably of copper or aluminium, stranded together by conventional methods. The insulating layer 4 and the possible semiconductive layers 5 and 6 comprise the aforedescribed polymer composition as their base polymer material. About the outer semiconductive layer 5 there is usually provided a screen 6, generally consisting of electrically conducting wires or tapes, helically wound. This screen is then covered with a sheath 7 of a thermoplastic material, for example non crosslinked polyethylene (PE).

FIG. 1 shows only one possible embodiment of a cable according to the invention. It is evident that suitable modifications known in the art can be made to this embodiment, but without departing from the scope of the invention. In particular, the polymer compositions of the invention can also be advantageously used to cover cables for telecommunications or data transmission, or mixed energy/telecommunications cables.

The EPDM terpolymers A, B and C, the characteristics of which are shown in Table 1, were used to prepare the compositions A, B and C shown in Table 1.

TABLE 1

|  | EPDM A (comparison) | EPDM B (comparison) | EPDM C |
|---|---|---|---|
| Diene | HEX | ENB | VNB |
| Catalysis | vanadium | metallocene | vanadium |
| BI | 0.62 | 0.83 | 0.10 |
| Mw/Mn | 3.60 | 3.70 | 29.90 |
| % ethylene[1] | 83.50 | 78.50 | 87.00 |
| % propylene[2] | 15.00 | 20.70 | 12.80 |

TABLE 1-continued

|  | EPDM A (comparison) | EPDM B (comparison) | EPDM C |
|---|---|---|---|
| % diene[3] | 1.50 | 0.80 | 0.20 |
| Mooney Viscosity ML 1 + 4 at 125° C.[4] | 26.00 | 25.00 | 31.00 |

EPDM A = Nordel$^R$ 2722 of Du Pont-Dow Elastomers (HEX = 1,4-hexadiene);
EPDM B = Nordel$^R$ IP of Du Pont-Dow Elastomers (ENB = 5-ethylidene-2-norbornene);
EPDM C = Vistalon$^R$ MDV 94-2 of Exxon Chemical (VNB = 5-vinyl-2-norbornene);
BI = branching index;
[1]determined in accordance with standard ASTM D3900;
[2]determined as complement to 100 of the sum ethylene/diene;
[3]determined by I.R.;
[4]determined in accordance with standard ASTM D1646-94.

TABLE 2

|  | COMPOSITION A (comparison) | COMPOSITION B (comparison) | COMPOSITION C |
|---|---|---|---|
| EPDM A | 95 | — | — |
| EPDM B | — | 95 | — |
| EPDM C | — | — | 95 |
| POLYETHYLENE | 5 | 5 | 5 |
| ZINC OXIDE | 5 | 5 | 5 |
| CALCINED KAOLIN | 60 | 60 | 60 |
| SILANE VTMOEO | 1 | 1 | 1 |
| ANTIOXIDANT HB | 1 | 1 | 1 |
| PARAFFIN | 5 | 5 | 5 |
| DICUMYL PEROXIDE | 2 | 2 | 2 |

Low-density linear polyethylene (Riblene$^R$ FL 30 of Polimeri Europa);

Silane A-172 (VTMOEO) of WITCO SPECIALITIES= vinyltris-(2-methoxyethoxy)silane;

Antioxidant ANOX$^R$ HB of GREAT LAKES=poly-2,2,4-trimethyl-1,2-dihydroquinoline;

Dicumyl peroxide Dicup$^R$ of Hercules.

The polymer compositions of the invention (composition C) were compared with other EPDM polymers (compositions A and B), varying the catalysis and the diene, and encountering better water resistance. The comparison compositions were also prepared without adding lead.

Compositions A, B and C were prepared using a 1.6 litre Banbury mixer with a volumetric filling coefficient of about 75%. The compositions obtained were used to prepare 1 mm cross-linked plates by compression moulding at 190–195° C. and 200 bar after preheating for 10 minutes at the said temperature.

Test-pieces were punched from these plates and were subjected to stress at break (SB) and elongation at break (EB) measurements in accordance with standard CEI 20–34 section 5.1, using an Instron apparatus and a clamp traction rate of 50 mm/min.

The other electrical and mechanical properties of the polymer compositions of the invention (composition C) are at least comparable to those presented by the other comparison mixtures (compositions A and B), as can be seen from the following table.

TABLE 3

|  | Analysis method | Unit | Comp. A comparis. | Comp. B comparis. | Comp. C |
|---|---|---|---|---|---|
| Mooney viscosity ML 1 + 4 at 100° C. | ASTM D1646-94 | Mooney | 59.00 | 51.20 | 40.90 |
| Cross-linkage curve (ODR at 180° C.) | | | | | |
| $M_L$ | ASTM D2084-93 | dN · m | 7.71 | 6.18 | 4.29 |
| $M_H$ | ASTM D2034-93 | dN · m | 76.06 | 79.31 | 72.74 |
| t90 | ASTM D2084-93 | minutes | 5'19" | 5'21" | 4'40" |
| Mechanical characteristics | | | | | |
| SB | CEI 20-34 sect. 5.1 | MPa | 328 | 246 | 257 |
| EB % | CEI 20-34 sect. 5.1 | % | 17.12 | 15.61 | 14.40 |

ODR = oscillating disc rheometer;
$M_L$ = minimum torque;
$M_H$ = maximum torque;
t90 = time at which a torque of $M_L + 0.90(M_H - M_L)$ is obtained;
SB = stress at break;
EB = elongation at break.

The dielectric strength of the polymer compositions of the invention (composition C) was evaluated on test-pieces obtained by the ageing method proposed by EFI (Norwegian Electric Power Research Institute) in the publication "The EFI Test Method for Accelerated Growth of Water Trees, presented at the "1990 IEEE International Symposium on Electrical Insulation", held in Toronto, Canada, 3–6 Jun. 1990, and compared with the already defined polymer compositions A and B.

According to this method, the cable is simulated by forming multi-layer test-pieces of cup shape, in which the constituent material of the insulating covering is sandwiched between two layers of semiconductive material More specifically, starting from a strip of thickness 5–7 mm, the layer of insulating material is thermoformed to cup shape at a temperature of 120° C. in an electrical press able to develop a pressure of about 90 t, to hence obtain a thickness of about 0.50 mm.

Layers of semiconductive material, extruded and preformed in a similar manner until a thickness of about 0.5 mm is achieved, are then pressed and heat-bonded onto opposite sides of the insulating layer at a temperature of about 180° C. for 15 minutes in an electrical press similar to that used for forming the layers themselves.

After being cooled to room temperature, the test-pieces obtained in this manner are subjected to an accelerated electrical ageing test by filling the cavity defined inside the test-piece with water, immersing a high-voltage electrode in the water and resting them on a metal plate (earth electrode).

To further accelerate the phenomenon the test is carried out under heating, for example in a suitable oven.

During the tests, the polymer compositions A, B and C were coupled to a semiconductive screen consisting of a cross-linked polyethylene mixture commercially available under the name NCPE 0592™ (Borealis N. V., Brussels, Belgium).

In accordance with said EFI method, 10 test-pieces were subjected to accelerated ageing in water under the following test conditions:

| electrical gradient | 5 kV/mm |
|---|---|
| temperature | 70° C. |

The dielectric strength was then measured in accordance with standard ASTM D-149 on a batch of 5 non-aged test-pieces (reference) and a batch of 3 test-pieces withdrawn 30 days after commencement of the accelerated electrical ageing.

The dielectric strength tests were carried out with silicone oil on the inside and outside of the test-pieces using a circular electrode and applying a voltage gradient of 2 kV/s.

The results of the tests carried out (average of 5 tests) are given in the following table.

TABLE 4

(EFI method)

|  | Dielectric strength (KV/mm) | | |
|---|---|---|---|
| Composition | reference | 30 days in $H_2O$ | Decay D.s. (%) |
| A (comparison) | 98 | 73.5 | 25 |
| B (comparison) | 105 | 84.7 | 19 |
| C | 109 | 97.7 | 10 |

From the data given in Table 4, it can be seen that, after ageing in water, the dielectric strength of the polymer compositions of the invention is overall higher than that of the comparison compositions and, in particular, undergoes low decay from its initial value (about 10%, and generally less than 15%), whereas for the comparison compositions the decay is about 20% or higher.

The loss factor (tangent of the loss angle —"tandelta") was also evaluated at 20° C. and 90° C. for the polymer compositions of the invention (composition C) in accordance with standard ASTM D-150 [AC Loss Characteristics and Dielectric Constant (Permittivity) of Solid Electrical Insulating Material].

Specifically, the loss factor was measured using as test-pieces moulded flat plates of 20×20 cm side and 1.0 mm thickness, and using circular electrodes with a guard ring. Before making the measurements, the test-pieces were heat-treated at 90° C. for 100 hours to eliminate cross-linkage by-products from each plate.

The results of the tests (average of 5 tests) are shown in the following table.

TABLE 5

| Tandelta | Comp. A comparison | Comp. B comparison | Comp. C |
|---|---|---|---|
| 20° C. | 1.5 | 1.8 | 1.5 |
| 90° C. | 2.5 | 2.9 | 2.9 |

The aforedescribed compositions A, B and C were used to produce medium-voltage cables. The cables were prepared by extrusion through a triple-head extruder onto a 1/0 AWG conductor consisting of an aluminium wire cord of about 54mm² cross-section.

The extruder, of 100 mm internal diameter, had the following temperature profile; from 90 to 110° C. within the cylinder, 120° C. on the collar and 120° C. within the head. The line speed was 2 m/min. The cables obtained in this manner had an inner semiconductive layer of 0.5 mm thickness, an insulating layer of 4.6 mm and an outer semiconductive layer of 0.5 mm.

Figure 2:
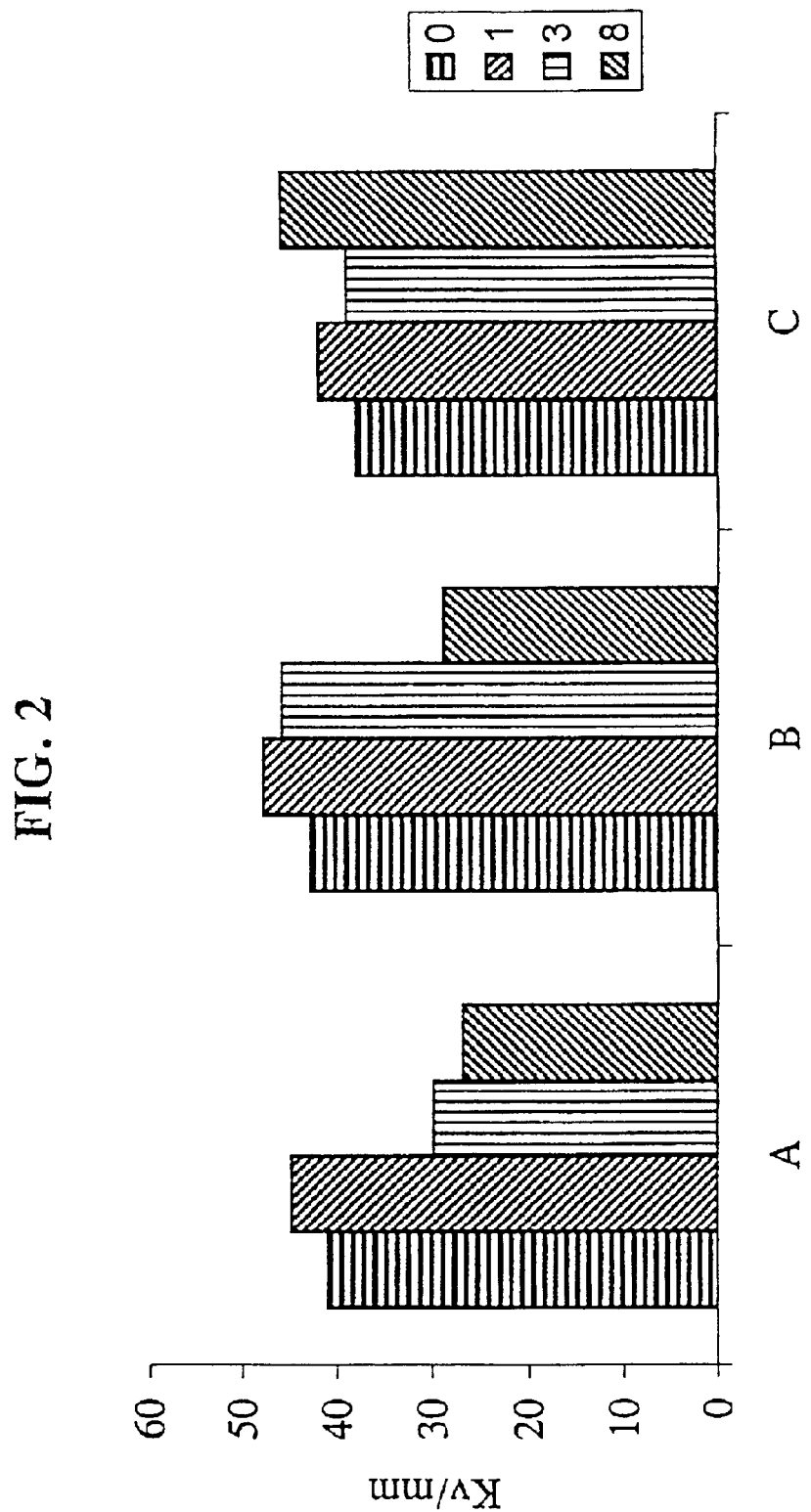
FIG. 2 shows the variation of dielectric strength with time for three compositions formed from three different EPDM polymers.

In FIG. 2, the histograms show the water resistance, evaluated by measuring the variation in dielectric strength, expressed in kV/mm, against time for the three cables formed from the polymer compositions A, B and C. At zero time it can be seen that the cables have substantially the same dielectric strength. After one month there is a slight increase in the values, followed after 3 months by a visible difference in behaviour of the cables formed from the three different compositions, however the results are still comparable.

After 8 months of observation the cables formed from the comparison compositions A and B undergo a clear reduction in dielectric strength whereas the cable formed from the composition C of the invention shows no substantial difference from the values found after 3 months.

The water resistance of the insulating layer in the cables prepared in this manner was evaluated by a method by ENEL (Ente Nazionale Energia Elettrica, ENEL Standard DC4584, December 1991, Ed. I-14/40), described below.

For each of the three different types of cable, three lengths of complete single-core cable were fully immersed in a tank filled with tap water maintained at a constant temperature of 70±3° C. The two ends of each length were then made to project into the air for a length sufficient to make the test terminals.

On each end of the pieces there was also mounted a vessel to ensure that water was present along the conductor. The conductor was heated by circulating current of such an intensity as to heat it to and maintain it at a temperature of 90±5° C. (measured in the portion in water) for a time of 8 months. An alternating voltage at an industrial frequency of 1.5 times the rated voltage of the cable was applied at one end between the conductor and the metal screen, which was connected to earth.

After 1, 3 and 8 months a piece of each type of cable was taken from the tank and divided into 10 portions, each of these then being subjected to the dielectric strength test in accordance with standard ASTM D-149 at room temperature, using alternating voltage at industrial frequency.

An initial voltage was applied between the conductor and the earth-connected screen for a time of 10 minutes, and then increased every 10 minutes until perforation of the insulation. The results are shown in the following table:

TABLE 6

(ENEL method)

Dielectric strength (kV/mm)

| MONTHS | Comp. A comparison | Comp. B comparison | Comp. C |
|---|---|---|---|
| 0 | 41 | 43 | 38 |
| 1 | 45 | 48 | 42 |
| 3 | 30 | 46 | 39 |
| 8 | 27 | 29 | 46 | and also shown in FIG. 2. These data highlight the substantial resistance of the cable of the invention for the whole period of observation (eight months), the dielectric strength measurements carried out after the third month on the cables obtained from compositions A and B showing much more rapid ageing in water than the cable of the invention.

What is claimed is:

1. An electric cable comprising at least one conductor and at least one insulating layer, said insulating layer comprising a substantially lead-free polymer composition comprising as base polymer material an elastomer terpolymer having the following composition:

a) 50–90 moles percent of ethylene;
b) 10–50 moles percent of an α-olefin; and
c) 0.16–5 moles percent of 5-vinyl-2-norbornene;

the sum of the moles percent of a), b), and c) being 100, said terpolymer having a branching index of less than or equal to 0.5 and a molecular weight distribution index $M_w/M_n$ of greater than or equal to 6.

2. An electric cable as claimed in claim 1, wherein the terpolymer has a Mooney viscosity [ML (1+4) at 125° C.] of 10–80.

3. An electric cable as claimed in claim 1, wherein the terpolymer has a branching index of less than or equal to 0.4.

4. An electric cable as claimed in claim 1, wherein the polymer composition has a zinc oxide content of less than 10 phr.

5. An electric cable as claimed in claim 4, wherein the zinc oxide content varies between 3 and 8 phr.

6. An electric cable as claimed in claim 1, wherein the polymer composition comprises an elastomer mixture comprising the elastomer terpolymer mixed with at least one other polymer in a quantity of less than or equal to 30 phr of the mixture and selected from polyolefins, thermoplastic propylene/ethylene polymers, ethylene/propylene elastomer copolymers, ethylene/propylene/diene elastomer copolymers, and mixtures thereof.

7. An electric cable as claimed in claim 6, wherein the one other polymer is selected from low-density polyethylene, low-density linear polyethylene, and very low density polyethylene.

8. An electric cable as claimed in claim 1, wherein the α-olefin is $CH_2=CH-R$, where R is a linear or branched alkyl containing 2 to 10 carbon atoms.

9. An electric cable as claimed in claim 8, wherein the α-olefin is selected from propylene, 1-butene, 1-pentene, 1,4-methyl-1-pentene, 1-hexene, 1-octene, 1-decene, 1-dodecene and combinations thereof.

10. An electric cable as claimed in claim 8, wherein the α-olefin is propylene.

11. An electric cable as claimed in claim 1, further comprising at least one layer with semiconductive properties comprising the polymer composition as claimed in claim 22 having a conductive filler dispersed therein.

* * * * *